United States Patent
Fox et al.

[15] 3,657,101
[45] Apr. 18, 1972

[54] SPARGER FOR INTRODUCING FEED ADJACENT TO BOTTOM OF POROUS ELECTRODE

[72] Inventors: Homer M. Fox; Forrest N. Ruehlen; Keith A. Williams, all of Bartlesville, Okla.

[73] Assignee: Phillips Petroleum Company

[22] Filed: Aug. 28, 1970

[21] Appl. No.: 67,951

Related U.S. Application Data

[62] Division of Ser. No. 739,476, June 24, 1968, abandoned.

[52] U.S. Cl. .............................. 204/284, 204/289, 204/294
[51] Int. Cl. ........................................ B01r 3/04, C23b 5/74
[58] Field of Search ............. 204/59, 72, 81, 279, 280, 284, 204/283, 286, 288, 289, 294; 260/671 B

[56] References Cited
UNITED STATES PATENTS

| | | | |
|---|---|---|---|
| 3,393,249 | 7/1968 | Fox et al. | 204/81 X |
| 3,236,759 | 11/1966 | Robinson | 204/286 |
| 3,298,940 | 1/1967 | Ashley et al. | 204/59 |
| 3,017,336 | 1/1962 | Olstowski | 204/284 X |
| 2,358,419 | 9/1944 | Schumacher et al. | 204/294 X |
| 2,273,795 | 2/1942 | Heise et al. | 204/72 X |

Primary Examiner—John H. Mack
Assistant Examiner—Regan J. Fay
Attorney—Young & Quigg

[57] ABSTRACT

In an electrochemical process, the reaction takes place within the confines of a porous electrode element. The feed materials are introduced into the bottom of this porous electrode element by means of a sparger which is positioned within the bulk of the electrolyte adjacent a bottom surface of said electrode element.

19 Claims, 10 Drawing Figures

PATENTED APR 18 1972 3,657,101
SHEET 1 OF 2
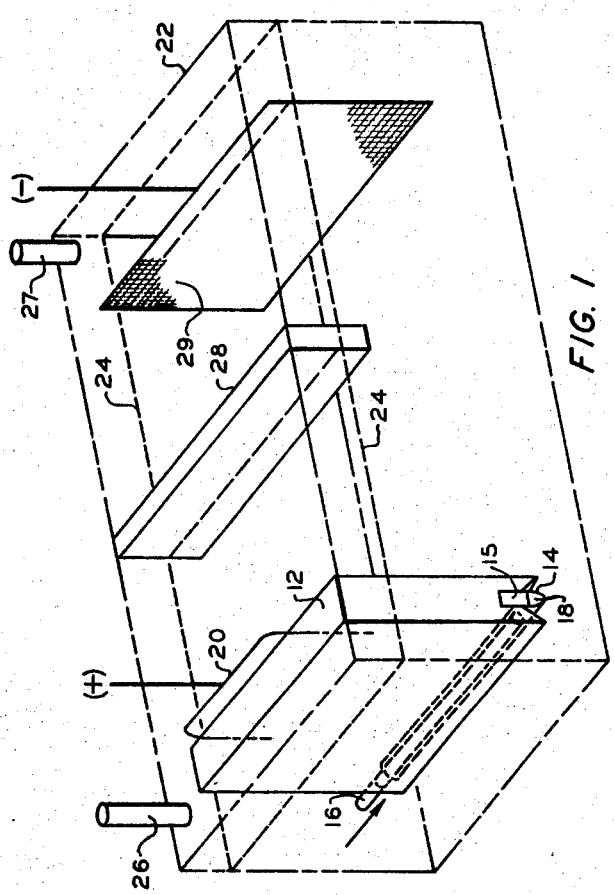
FIG. 1
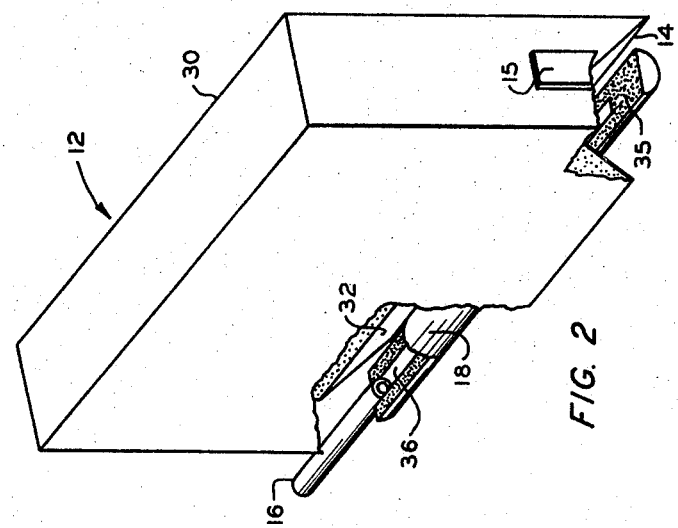
FIG. 2
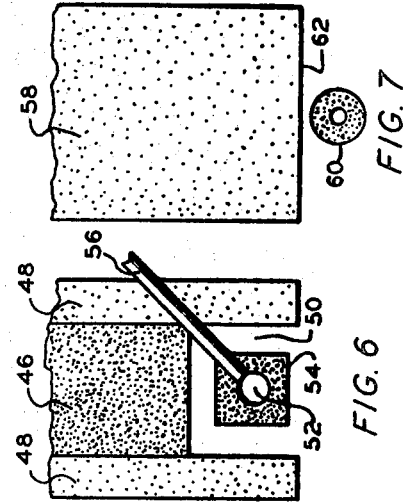
FIG. 7
FIG. 6
FIG. 5
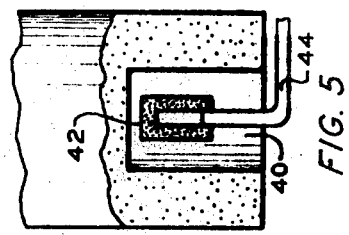
FIG. 4
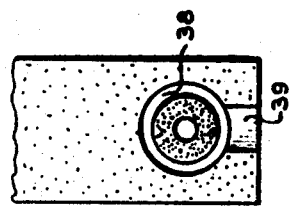
FIG. 3
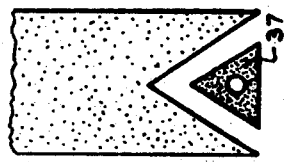
INVENTORS
F. N. RUEHLEN
H. M. FOX
K. A. WILLIAMS
BY
Young and Quigg
ATTORNEYS

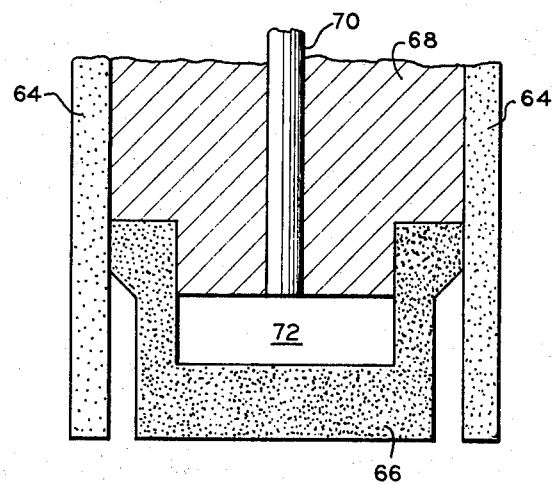
FIG. 8
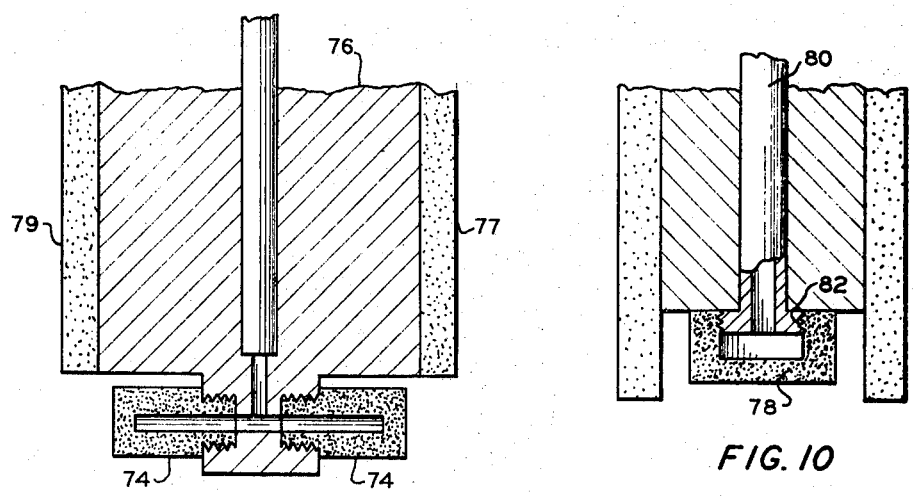
FIG. 9
FIG. 10

3,657,101

SPARGER FOR INTRODUCING FEED ADJACENT TO BOTTOM OF POROUS ELECTRODE

BACKGROUND OF THE INVENTION

This application is a division of our copending application Ser. No. 739,476, filed June 24, 1968, now abandoned.

This invention relates to electrode elements and processes for electrochemical conversion.

Porous electrode elements, particularly porous carbon anodes are widely used in electrochemical conversion reactions. Generally, the utilization of such elements has involved immersing the element in an electrolyte and passing an electric current through this electrolyte from this element to an oppositely charged element. At least a portion of the materials within the electrolyte is converted into products at one or both electrodes. In a variation on this process, an additional feedstock for the conversion process is bubbled into the electrolyte through a porous electrode element, such as a porous carbon anode, to produce still different products.

Very recently it has been discovered that the reaction in an electrochemical conversion operation can be carried out within the confines of the porous electrode element itself. This type of operation is of particular utility in electrochemical fluorination because it makes possible a simple one-step route to partially fluorinated products which had previously been difficult to obtain. Carrying out the fluorination reaction within the porous anode, in addition to making possible the direct production of partially fluorinated products, also allows operation at high rates of conversion and without the formation of substantial amounts of cleavage products generally produced by the older methods when operating at high conversion rates. The feed to be fluorinated is introduced into the porous anode at a point near its bottom and the fluorinated mixture exits at the top of the anode, generally above the electrolyte level. Passage of the feed into the bulk of the electrolyte is avoided.

It is apparent that if the reaction is to take place within the electrode element, larger electrodes are desirable in order to increase the available surface area wherein the reaction takes place. However with larger electrodes, it has been found that an uneven distribution of feed material can result within the electrode.

Nonuniform distribution of the feed material results in a partial loss of the advantage of this type of operation with respect to the production of only partially fluorinated products; this is because in systems, for instance, utilizing a KF·2HF electrolyte, the fluorinating species are generated continuously throughout the submerged surface of the electrode element and thus, in areas where feed is not distributed properly, the excess of fluorinating species will fluorinate the available feed all the way to perfluoro products, or even produce undesirable cleavage products. Also nonuniform feed distribution can result in sudden contact of accumulated fluorine with accumulated feed material or with hydrogen from the other electrode element to give an explosive reaction. It can thus be seen that uniform distribution of the feed material and, consequently, uniform contact of the feed material with the electrolyte at the point of reaction are of prime importance.

This problem of nonuniform distribution of the feed material can be solved to some extent by using feed distribution laterals in the lower portion of the electrode element. However, these feed distribution laterals, unless they are protected in some fashion, can become flooded with electrolyte and become plugged on continued usage.

SUMMARY OF THE INVENTION

It is an object of this invention to provide an improved process and apparatus wherein the reaction in an electrochemical conversion process using a porous electrode element is carried out within the confines of the electrode element.

It is yet a further object of this invention to provide for uniform distribution of feed to a porous electrode element.

In accordance with this invention the feed materials in an electrochemical process are introduced into a porous electrode element by means of a sparger located within the bulk of the electrolyte adjacent to a bottom surface of the porous electrode.

BRIEF DESCRIPTION OF THE DRAWINGS

In the drawings, forming a part hereof, in which like reference characters denote like parts in the various views, FIG. 1 is a schematic representation of an electrochemical cell utilizing a sparger feed section in accordance with the instant invention.

FIG. 2 is an enlarged view, partially in section of the rectangular electrode of FIG. 1.

FIG. 3 is a cross-sectional view of the lower portion of a rectangular electrode element and sparger in accordance with an alternate embodiment of this invention.

FIG. 4 is a cross section through another embodiment of the instant invention wherein the sparger is surrounded by an electrolyte-containing annular area.

FIG. 5 is a view partially in section of the lower portion of an electrode element in accordance with another embodiment of this invention wherein the sparger is positioned within a cavity drilled out in the bottom of a cylindrical electrode element.

FIG. 6 is a cross-sectional view of the lower portion of a rectangular electrode element in accordance with another embodiment of the instant invention wherein the electrode element is a composite of different grades of porous material.

FIG. 7 is a cross-sectional view of the lower portion of a rectangular electrode element in accordance with another embodiment of the instant invention wherein the sparger is positioned below the bottom of a flat bottomed electrode element.

FIG. 8 is a cross-sectional view of the lower portion of a cylindrical electrode element in accordance with another embodiment of the instant invention wherein the sparger is an integral part of the electrode element.

FIGS. 9 and 10 are cross-sectional views of the lower portion of rectangular and cylindrical electrode elements, respectively, in accordance with the instant invention wherein the spargers are affixed to the electrode element by means of a screw connection.

DESCRIPTION OF THE PREFERRED EMBODIMENTS

The spargers of the instant invention can be positioned either within a cavity in the bottom of the electrode element which cavity is open to the bulk of the electrolyte, as shown by FIGS. 1 to 6 and 8 to 10, or the sparger can be positioned below the bottom of a flat bottomed porous electrode element as shown by FIG. 7.

It is most remarkable that the electrodes of the invention can be fed in such a simple fashion and that uniform distribution of feed, can be assured by introducing the feed through a sparger which is positioned within the bulk of the electrolyte adjacent the bottom of the porous electrode element. Even more remarkable is the fact that this can be done and still maintain the required mode of operation wherein the reaction takes place within the confines of the pores of the porous electrode element as opposed to taking place within the bulk of the electrolyte.

In the embodiment utilizing a cavity, the size and shape of the cavity can vary depending on the size and shape of the electrode element. The shape of the sparger is preferably complementary to the shape of the cavity as shown in the drawings, although this is not essential. With a cylindrical electrode, a hole can simply be drilled in the bottom of the electrode to form the cavity. With a slab-type electrode the cavity can take the form of an elongated recessed portion in the bottom of the electrode. The cavity can also take the form of a large feed distribution lateral drilled through all or most of the length of a slab-type electrode parallel to the bottom of the electrode and in open communication with the electrolyte at one or more points along the lateral, generally at each open end of the lateral; the sparger is then centrally disposed within this lateral, the electrolyte filling the annular area around the sparger and said electrolyte being in open communication with the bulk of the electrolyte in the cell. This type of arrangement is shown in cross section in FIG. 4; the section in FIG. 4 is taken along an area through the drain hole.

A nonwetting electrolyte is used; therefore, the feed materials are generally far more compatible with the surface of the electrode element than is the electrolyte and apparently for this reason they are very rapidly absorbed into the porous electrode element. Even in arrangements such as that shown in FIG. 7 the feed is immediately absorbed by the porous electrode element and does not bubble out into the electrolyte except for the distance it travels in going directly from the sparger to the bottom of the porous electrode element, thus allowing the essential mode of operation whereby the reaction takes place within the confines of the pores of the porous electrode element.

A nonwetting electrolyte is one wherein the contact angle between the electrolyte and the porous electrode material is greater than 90° in order that the anticapillary forces will prevent substantial impregnation of the small pores of the porous electrode element by the electrolyte. Nonwetting electrolyte-electrode combinations can be obtained simply by a suitable choice of these cell components. For example, the metal fluoride-containing HF electrolytes commonly used in fluorine generation or electrochemical fluorination are nonwetting to carbon electrodes. If an electrode is wetted by an electrolyte, it can be conventionally treated with a wetproofing agent.

The sparger may either be connected to the porous electrode element or insulated therefrom. Thus it may either be of the same potential as the porous electrode element or float in potential in between that of the porous electrode element and that of the other electrode element in the cell. For instance where the porous electrode element is an anode used in electrochemical fluorination, the sparger must not be cathodic enough to liberate free hydrogen as this will reduce the electrical efficiency of the cell; it may either be in electrical connection with the anode or may float in potential between the anode and cathode.

The sparger can be an integral part of the electrode element as shown in FIG. 8; it can be attached by means of insulating straps 15 as shown in FIG. 1; it can be mechanically affixed for easy removal, for instance by means of a snap-on or screw-on connection as shown in FIG. 9, or it can simply float unconnected from the porous electrode element as shown, for instance, in FIG. 5. In embodiments where it is affixed by a quick removal type of connection such as the screw connections of FIGS. 9 and 10, it can either be affixed to a portion of the porous electrode or to the metallic current collector and feed introduction channel. The connection can be direct or through a nonconducting adaptor.

The choice of the material to make the porous sparger is extremely important. The sparger must give good distribution at very low flow rates, the low flow rates being required to give sufficient conversion of the feed per pass. Materials which are not wetted by the electrolyte are presently preferred. In electrochemical fluorination systems using HF-containing electrolyte, porous carbon or porous polytetrafluoroethylene (Teflon) are by far the preferred materials. Other materials which resist wetting by the electrolyte such as metals or plastics can also be used if they are not corroded by the system and if the pore size can be small enough and uniform enough that the pressure drop is sufficient to keep the electrolyte out of the sparger. Plastic materials are particularly desirable in instances where it is desirable to have an electrically nonconductive sparger. In general, any plastic material which has suitable porosity, which is nonwetting, and which will physically and chemically withstand the environment of the cell can be used. Thus, polytetrafluoroethylene, high density polyethylene, polypropylene, and the like, can frequently be used.

The maximum pore size in the sparger depends somewhat upon the depth of operation. At a 12-inch depth, the hydrostatic head can sometimes be sufficient to cause the electrolyte to invade pores larger than about 70 microns. At shallower depths the largest pores can be a little larger while at immersion depths greater than 12 inches, the largest pores must of necessity be smaller to avoid flooding of the sparger by the electrolyte. To be safe in avoiding a few large pores, the average pore size of the sparger should be small, for instance, less than about 20 microns. Thus, suitable porous materials having an average pore size of 0.01–30, preferably 0.1–10 microns, can be used. The sparger should have a permeability in the range of from about 0.001 to about 4, preferably 0.02 to about 0.5 darcys. The total porosity or void space in the porous sparger is of less importance; it will generally total less than about 35 per cent. The relatively small and uniform pores of the sparger allows the feedstock to be introduced into the electrode element from a plurality of points and in the form of a multitude of very small bubbles.

The porous electrode element can be any porous electrode material suitable for electrochemical conversion reactions taking place within the confines of the electrode material, specifically within the pores of the electrode material. It can, for example, consist of a single piece of uniform porous carbon. It can have a variable porosity with smaller pores at the bottom and larger pores at the top so as to enable deeper immersion into the electrolyte. It can have variable porosity from outside to inside, with smaller pores in the core section and larger pores on the outside in contact with the electrolyte. It can also be a three-section "sandwich" electrode element having large pores in the outer section surrounding a central core, the large pores being in contact with the electrolyte, and the core being comprised of an impermeable current conductive material such as nonporous carbon or metal.

With such "sandwich" embodiments, it is generally desirable that the outer section of the composite be relatively thin for uniformity of conversion. For example, outer sections of about 1 inch or less, even 0.5 inch or less, can frequently be utilized with advantage because they provide an improved surface to volume relationship. Thin sections of some highly porous materials frequently lack mechanical strength and, thus, such composite laminates are often desirable.

The optimum surface to volume ratio of the reaction section, or larger pore diameter portion of the electrode if it is a "sandwich" electrode, will depend upon a number of factors among which are the desired degree of conversion and the depth of the electrode immersion. For example, in the electrochemical fluorination of a feedstock such as ethylene dichloride, a surface to volume ratio of about 2 in.$^{-1}$ is satisfactory when the "sandwich" electrode immersion is about 12 inches and the hydrogen conversion is about 50 per cent. Ordinarily, surface to volume ratios from about 1 to about 3 in.$^{-1}$ are used but, as mentioned above, this is dependent upon other conditions, and ratios of up to about 10 in.$^{-1}$ can be used with some combination of conditions which include very shallow electrode immersions. The surface to volume ratio is computed as the electrogeometric surface, in square inches, of the reaction section, divided by the volume, in cubic inches, of the reaction section. The electrogeometric surface is the geometric working surface, of the high pore diameter reaction section, which is below the electrolyte level and actually in contact with the bulk of the electrolyte. The volume of the reaction section is simply the geometric volume which is below the electrolyte level and exclusive of any core components.

In the porous electrode element, the average pore diameter of the porous reaction section will generally be in the range of 1 to 150 microns, preferably between 40 and 140 microns, and still more preferably between 50 and 120 microns. These values depend somewhat on the depth of immersion of the electrode with deeper immersions requiring somewhat smaller pores. Generally the permeability of such electrodes will be in the range of 0.5 to 75 darcys, preferably from about 5 to about 75, and still more preferably 10 to 70, darcys. In general the total porosity will be in the range of about 15 to about 60 percent.

The feed material is discharged into the cavity where it is rapidly absorbed into the porous electrode element. While it is not desired to limit the invention to any theory of operation, it is believed that the electrolyte partially penetrates the electrode through some of the larger pores. The feed material distributes itself throughout the porous electrode and migrates to near the outer surface to form a three-phase boundary of feed, electrolyte, and electrode element, at which point the reaction takes place. The product and unreacted feed then migrate up to the portion of the electrode element above the electrolyte level where they are collected, without ever having broken out into the bulk of the electrolyte. (The feed is momentarily in contact with the bulk of the electrolyte when it bubbles out at the sparger.)

The porous portion of the porous elements of the electrode assemblies of the invention can be fabricated from any suitable conducting porous electrolyte resistant material which is compatible with the system, e.g., nickel, iron, various metal alloys, and carbon, which is not wetted by the electrolyte. Porous carbon, which is economical and readily available in ordinary channels of commerce, is presently preferred for said porous element. In many instances it is advantageous to provide a metal element in contact with the porous carbon element. For instance a porous carbon anode can have a nickel screen wrapped around it. Various grades of porous carbon can be used in the practice of the invention. It is preferred to employ porous carbon which has been made from carbon produced by pyrolysis, and not graphitic carbon. The electrodes of the invention can be fabricated in any suitable shape or design, but must be arranged or provided with a suitable means for introducing the feed reactant material into the pores of the porous element thereof. This is ordinarily accomplished by positioning the sparger feed section, which is in communication with the feed supply adjacent the bottom of the porous reaction section of the electrode element.

The electrode assemblies of the invention can be employed in any convenient cell configuration or electrode arrangement. The only requirements are that the cell body and the electrodes in the cell be fabricated of materials which are resistant to the action of the contents of the cell under the reaction conditions. Materials such as steel, iron, nickel, polytetrafluoroethylene (Teflon), carbon, and the like, can frequently be employed for the cell body. When a nonporous cathode or a nonporous anode is employed which is not fabricated in accordance with this invention (along with a porous anode or a porous cathode of the invention), said nonporous cathode or nonporous anode can be fabricated in any suitable shape or design and can be made of any suitable conducting material such as iron, steel, nickel, alloys of said metals, carbon, and the like. For example, said nonporous cathode can be fabricated from a metal screen or gauze, a perforated plate, and can have a shape complementary to the shape of the porous anode.

The electrode assemblies of the invention can be employed in a wide variety of electrochemical conversion processes in which the porous electrode is not wetted by the particular electrolyte being used, and wherein the reaction takes place within the confines of the electrode. Some examples of such processes are electrochemical halogenation, electrochemical cyanation, and cathodic conversions such as the reduction of alcohols to hydrocarbons or the reduction of acids to alcohols. One electrochemical conversion process in which the electrode assemblies of the invention are particularly valuable is the electrochemical fluorination of fluorinatable materials in the presence of an essentially anhydrous liquid hydrogen fluoride containing electrolyte. Thus, for purposes of convenience, and not by way of limitation, the electrode assemblies of the invention are primarily described in terms of being employed as an anode in the electrochemical fluorination of fluorinatable materials when using said hydrogen fluoride containing electrolyte.

As referred to hereinabove, the instant invention is applicable to electrochemical conversion reactions wherein a current-conducting essentially anhydrous liquid hydrogen fluoride electrolyte is electrolyzed in an electrolysis cell provided with a cathode and a porous anode (preferably porous carbon), a fluorinatable organic compound is introduced into the pores of said anode and therein at least a portion of said organic compound is at least partially fluorinated within the pores of said anode, and fluorinated compound products are recovered from said cell. The present invention provides improved electrode assemblies which are especially suited to be employed as anodes in said process to produce partially fluorinated materials and/or to fluorinate organic compounds with little or no scission of carbon to carbon bonds.

Very few organic compounds are resistant to fluorination. Consequently, a wide variety of feed materials, both normally liquid and normally gaseous compounds, can be used as feedstocks in this process. Organic compounds which are normally gaseous or which can be introduced in gaseous state into the pores of a porous anode under the conditions employed in the electrolysis cell, and which are capable of reacting with fluorine, are presently preferred as starting materials. However, starting materials which are introduced into the pores of the anode in liquid state can also be used. Generally speaking, desirable organic starting materials which can be used are those containing from one to eight, preferably one to six, carbon atoms per molecule. However, reactants which contain more than eight carbon atoms can also be used. If desired, suitable feed materials having boiling points above cell operating temperatures can be passed into the pores of the porous anode in gaseous state by utilizing a suitable carrier gas. Thus, a suitable carrier gas can be saturated with the feed reactant (as by bubbling said carrier gas through the liquid reactant), and then passing the saturated carrier gas into the pores of the porous anode. Suitable carrier gases include the inert gases such as helium, argon, krypton, neon, xenon, nitrogen, etc. Normally gaseous materials such as hydrocarbons containing from one to four carbon atoms can also be used as carrier gases. These latter gases will react, but in many instances this will not be objectionable. The above-described carrier gases, and particularly said inert gases, can also be used as diluents for the feedstocks which are normally gaseous at cell operating conditions.

Some general types of starting materials which can be used include, among others, the following: alkanes, alkenes, alkynes, amines, ethers, esters, mercaptans, nitriles, alcohols, aromatic compounds, and partially halogenated compounds of both the aliphatic and aromatic series. It will be understood that the above-named types of compounds can be either straight chain, branched chain, or cyclic compounds. Partially chlorinated and the partially fluorinated compounds are the preferred partially halogenated compounds. The presently preferred starting materials are the saturated and unsaturated hydrocarbons (alkanes, alkenes, and alkynes) containing from one to six carbon atoms per molecule. The presently more preferred starting materials are the normally gaseous organic compounds, and particularly said saturated and unsaturated hydrocarbons, containing from one to four carbon atoms per molecule.

Since fluorine is so reactive, no list of practical length could include all starting materials which can be used. However, representative examples of the above-described starting materials include, among others, the following: methane; ethane; propane; butane; isobutane; pentane; n-hexane; n-octane; cyclopropane; cyclopentane; cyclohexane; cyclooctane; 1,2-dichloroethane; 1-fluoro-2-chloro-3-methylheptane; ethylene; propylene; cyclobutene; cyclohexene; 2-methylpentene-1; 2,3-dimethylexene-2; butadiene; vinyl chloride; 3-fluoropropylene; acetylene; methylacetylene; vinylacetylene; 4,4-dimethylpentyne-2; allyl chloride; methylamine; ethylamine; diethylamine; 2-amino-3-ethylpentane; 3-bromopropylamine; triethylamine; dimethyl ether; diethyl ether; methylethyl ether; methylvinyl ether; 2-iodoethylmethyl ether; di-n-propyl ether; methyl formate; methyl acetate; ethyl butyrate; ethyl formate; n-amyl acetate; methyl 2-chloroacetate; methyl mercaptan; ethyl mercaptan; n-propyl mercaptan; 2-mercaptohexane; 2-methyl-3-mercaptoheptane; acetonitrile; propionitrile; n-butyronitrile; acrylonitrile; n-hexanonitrile; methanol; ethanol; isopropanol; n-hexanol; 2,2-dimethylhexanol-3; n-butanol; ethylenebromohydrin; benzene; toluene; cumene; o-xylene; p-xylene; and monochlorobenzene.

In addition to such fluorinatable organic materials described above, carbon monoxide and oxygen can be used as feedstocks to provide carbonyl fluoride and oxygen difluoride, respectively.

The electrochemical fluorination process is carried out in a medium of hydrogen fluoride electrolyte. Although said hydrogen fluoride electrolyte can contain small amounts of water, such as up to about 5 weight per cent, it is preferred that said electrolyte be essentially anhydrous. The hydrogen fluoride electrolyte is consumed in the reaction and must be either continuously or intermittently placed in the cell.

Pure anhydrous liquid hydrogen fluoride is nonconductive. The essentially anhydrous liquid hydrogen fluoride described above has a low conductivity which, generally speaking, is lower than desired for practical operation. To provide adequate conductivity in the electrolyte, and to reduce the hydrogen fluoride vapor pressure at cell operating conditions, an inorganic additive can be incorporated in the electrolyte. Examples of suitable additives are inorganic compounds which are soluble in liquid hydrogen fluoride and provide effective electrolytic conductivity. The presently preferred additives are the alkali metal (sodium, potassium, lithium, rubidium, and cesium) fluorides and ammonium fluoride. Other additives which can be employed are sulfuric acid and phosphoric acid. Potassium fluoride, cesium fluoride, and rubidium fluoride are the presently preferred additives. Potassium fluoride is the presently most preferred additive. Said additives can be utilized in any suitable molar ratio of additive to hydrogen fluoride within the range of from 1:4.5 to 1:1, preferably 1:4 to 1:2. The presently most preferred electrolytes are those which correspond approximately to the formulas $KF \cdot 2HF$, $KF \cdot 3HF$, or $KF \cdot 4HF$. Such electrolytes can be conveniently prepared by adding the required quantity of hydrogen fluoride to $KF \cdot HF$ (potassium bifluoride). In general, said additives are not consumed in the process and can be used indefinitely. Said additives are frequently referred to as conductivity additives for convenience.

The electrochemical fluorination can be effectively and conveniently carried out over a broad range of temperatures and pressures limited only by the freezing point and the vapor pressure of the electrolyte. Generally speaking, the fluorination process can be carried out at temperatures within the range of from minus 80° to 500° C. at which the vapor pressure of the electrolyte is not excessive, e.g., less than 250 mm Hg. It is preferred to operate at temperatures such that the vapor pressure of the electrolyte is less than about 50 mm Hg. As will be understood by those skilled in the art, the vapor pressure of the electrolyte at a given temperature will be dependent upon the composition of said electrolyte. It is well known that additives such as potassium fluoride cause the vapor pressure of liquid hydrogen fluoride to be decreased an unusually great amount. A presently preferred range of temperature is from about 60° C. to about 105° C. Higher temperatures sometimes tend to promote fragmentation of the product molecules.

Pressures substantially above or below atmospheric can be employed if desired, depending upon the vapor pressure of the electrolyte as discussed above. In all instances, the cell pressure will be sufficient to maintain the electrolyte in liquid phase. Generally speaking, the process is conveniently carried out at substantially atmospheric pressure. It should be pointed out that a valuable feature of the process is that the operating conditions of temperature and pressure within the limitations discussed above are not critical and are essentially independent of the type of feed employed in the process.

For purposes of efficiency and economy, the rate of direct current flow through the cell is maintained at a rate which will give the highest practical current densities for the electrodes employed. Generally speaking, the current density will be high enough so that anodes of moderate size can be employed, yet low enough so that the anode is not corroded or disintegrated under the given current flow. Current densities within the range of from 30 to 1,000, or more, preferably 50 to 500 milliamps per square centimeter of anode geometric surface area can be used. Current densities less than 30 milliamps per square centimeter of anode geometric surface area are not practical because the rate of fluorination is too slow. The voltage which is employed will vary depending upon the particular cell configuration employed and the current density employed. In all cases, under normal operating conditions, however, the cell voltage or potential will be less than that required to evolve or generate free or elemental fluorine. Voltages in the range of from 4 to 12 volts are typical. The maximum voltage will not exceed 20 volts per unit cell. Thus, as a guide, voltages in the range of 4 to 20 volts per unit cell can be used.

As used herein unless otherwise specified, the term "anode geometric surface" refers to the outer geometric surface area of the porous carbon element of the anode which is exposed to electrolyte and does not include the pore surfaces of said porous element.

The feed rate of the fluorinatable material being introduced into the pores of the porous carbon element of the anode is an important process variable in that, for a given current flow or current density, the feed rate controls the degree of conversion. Similarly, for a given feed rate, the amount of current flow or current density can be employed to control the degree of conversion. Gaseous feed rates which can be employed will preferably be in the range of from 0.5 to 10, milliliters per minute per square centimeter of anode geometric surface area. With the higher feed rates, higher current density and current rates are employed. Since the anode can have a wide variety of geometrical shapes, which will affect the geometrical surface area, a sometimes more useful way of expressing the feed rate is in terms of anode cross-sectional area (taken perpendicular to the direction of flow). On this basis, for a typical anode, the above range would be 25 to 500 milliliters per minute per square centimeter of cross-sectional area.

The actual feed rate employed will depend upon the type of carbon used in fabricating the porous element of the anode as well as several other factors including the nature of the feedstock, the conversion desired, current density, etc., because all these factors are interrelated and a change in one will affect the others. The feed rate will be such that essentially none of the feed, after having been absorbed, leaves the anode to form bubbles which escape into the main body of the electrolyte. Essentially all of the feedstock and/or reaction product travels within the carbon anode via the pores therein until it reaches a collection zone within the anode from which it is removed via a conduit, or until it exits from the anode at a point above the surface of the electrolyte.

The more permeable carbons will permit higher flow rates than the less permeable carbons. Similarly, electrode shapes, electrode dimensions, and manner of disposition of the electrode in the electrolyte will also have a bearing on the flow rate. Thus, owing to the many different types of carbon which can be employed and the almost infinite number of combinations of electrode shapes, dimensions, and methods of disposition of the electrode in the electrolyte, there are no really fixed numerical limits on the flow rates which can be used. Broadly speaking, the upper limit on the flow rate will be that at which "breakout" of feedstock and/or fluorinated product begins along the immersed portion of the electrode element. Unless otherwise specified, "breakout" is defined as the formation of bubbles of feedstock and/or fluorinated product on the outer immersed surface of the electrode element with subsequent detachment of said bubbles wherein they pass into the main body of the electrolyte. Broadly speaking, the lower limit of the feed rate will be determined by the requirement to supply the minimum amount of feedstock sufficient to prevent evolution of free fluorine. As a practical guide to those skilled in the art, the gaseous flow rates can be within the range of from 3 to 600, preferably 12 to 240, cc (STP) per minute per square centimeter of cross-sectional area (taken perpendicular to the direction of flow).

Although the electrolyte is nonwetting, there will be some penetration of the large pores of the electrode element by the hydrogen fluoride electrolyte as previously noted. The amount of said penetration will depend upon the pore size and other factors. The larger size pores are more readily penetrated. It has been found that porous carbon anodes as described herein can be successfully operated when up to about 40 or 50 per cent of the pores have been penetrated by liquid HF electrolyte.

The feed material and the products obtained therefrom are retained in the cell for a period of time which is generally less than 1 minute. Because the residence time is comparatively short and is especially uniform, the production of the desired products is facilitated. The fluorinated products and the unconverted feed are passed from the cell and then are subjected to conventional separation techniques such as fractionation, solvent extraction, adsorption, and the like, for separation of unconverted feed and reaction products. Unconverted or insufficiently converted feed materials can be recycled to the cell for the production of more highly fluorinated products, if desired. Perfluorinated products, or other products which have been too highly fluorinated, can be burned to recover hydrogen fluoride which can be returned to the cell, if desired. By-product hydrogen, produced at the cathode, can be burned to provide heat energy or can be utilized in hydrogen-consuming processes such as hydrogenation, etc.

Referring now to the drawings, particularly FIG. 1, there is shown in schematic representation a complete electrochemical conversion cell having a porous electrode element 12. In the bottom of porous anode 12 is cavity 14. Feed from line 16 is introduced into sparger 18 which is positioned within the bulk of the electrolyte within cavity 14. Sparger 18 is held in place by electrically insulating connection strap 15. Current collector 20 is embedded in the upper portion of porous electrode element 12. Said porous electrode element 12 is disposed in cell container 22. The upper end of said porous electrode element is above the level of the electrolyte in said container as depicted by reference character 24. Thus, the upper end surface of porous electrode element 12 comprises a second surface for withdrawing unreacted feedstock and product from the pores of the porous electrode element 12, the inner wall of cavity 14 comprising a first surface for the introduction of feed materials into the pores of said porous element 12. Conduit 26 comprises a second conduit means for withdrawing product and unreacted feedstock from within the pores of porous electrode element 12. If desired, the space above the electrolyte can be divided by a partition 28 extending from the top of the cell to below the level of the electrolyte to keep the anode products separated from the cathode products; or a conventional cell divider can be employed to divide the cell into an anode compartment and a cathode compartment. However, such a divider is not essential. A separate conduit 27 removes material generated at cathode 29.

Referring now to FIG. 2, there is shown an enlarged view of the anode of FIG. 1, partially in section, having a body portion 30 of relatively high pore diameter porous carbon, elongated cavity 14 and sparger 18 made of relatively low pore diameter porous carbon. Running along the center of sparger 18 is channel 36 which terminates just short of the end 35 of the sparger.

In FIG. 3 there is shown a porous electrode-sparger arrangement similar to that of FIG. 2 except the sparger 37 has a configuration complementary to that of the cavity. While not specifically shown in this figure, the end of the sparger is closed off in all embodiments by a portion similar to portion 35 of FIG. 2.

In FIG. 4 there is shown in section the lower portion of a porous electrode in which the sparger is disposed in a large channel drilled near the bottom of the anode parallel to the bottom of the anode. Electrolyte fills the annular space 38. This figure is taken along a line near the far end of the channel so as to show a drain hole 39 where annular area 38 is in open communication with the bulk of the electrolyte.

In FIG. 5 there is shown a cylindrical porous electrode partially in section wherein a cavity is formed by drilling a hole 40 in the bottom of the anode. Disposed within this cavity is sparger 42, the feed being carried to this sparger via line 44.

Referring now to FIG. 6 there is shown a cross-sectional view of the lower portion of a rectangular slab-type porous electrode having an inner core section 46 of relatively low pore diameter carbon; affixed on each side of this core section are slabs 48 of relatively high pore diameter carbon. Slabs 48 extend down below the end of core 46 thus forming an elongated cavity 50. Feed is introduced into channel 52 of sparger 54 by means of line 56 which comes in at an angle from the side. Sparger 54 is comprised of relatively low pore diameter carbon identical to that portion making up core 46.

Referring now to FIG. 7, there is shown the lower portion of a porous carbon electrode 58 having a sparger 60 disposed just beneath the flat bottom 62 of electrode 58.

Referring now to FIG. 8, there is shown a cylindrical electrode in accordance with the instant invention having outer sections 64 of relatively high pore diameter carbon, a sparger 66 made of relatively low pore diameter carbon and integrally affixed to the anode, and a core portion 68 comprised of impervious carbon. Centrally disposed through said core is hollow copper tube 70 which serves the dual function of transmitting the feed material into channel 72 of sparger 66 and also of serving as the current collector.

Referring to FIG. 9, there is shown a rectangular electrode in accordance with the instant invention in which sparger elements 74 are screwed into an extension of core section 76. This section is taken longitudinally; as can be seen, high pore diameter sections 77 and 79 do not extend below core 76 at the ends. If desired, sections 77 and 79 can be made to extend below core 76. While not shown in this figure, high pore diameter slabs are laminated to the sides of core 76 and extend below core 76 along these sides as shown in the electrode shown in FIG. 6.

In FIG. 10 there is shown another cylindrical electrode embodiment of the instant invention wherein sparger element 78 is removably attached directly to copper tube 80 by means of a screw connection 82.

Many conventional parts such as electrical circuitry, flow regulators, and the like have not been shown for the purpose of simplicity, but their inclusion is understood by those skilled in the art and is within the scope of the invention. Similarly, the schematic representations show relative dimensions which may or may not be optimum for specific situations. For example, the distance between anode and cathode can be much smaller than what is illustrated.

EXAMPLE I

A slab of porous carbon (National Carbon NC–60 having a porosity of about 50 per cent, a permeability of about 6 darcys, and an average pore size of about 45 microns), measuring 6 × 14 × 1-½ inches, was fitted with two copper current collectors inserted 5 inches into the top of the carbon. The bottom of the slab was slotted with about a 1 × 1 inch channel. A sparger of a tight porous carbon (Stackpole 139 having a porosity of about 30 per cent, a permeability of about 0.056 darcys, and pores of 0.1–10 microns averaging about 3 microns), measuring about 6 × 1 × ¾ inches was suspended, with Teflon straps, directly beneath the carbon electrode and within the channel but not in electrical contact. In the sparger was a feed distribution channel, a lateral ¼-inch hole extending almost the length of the sparger. This hole was connected with a fitting to a ¼-inch Teflon-jacketed copper feed tube.

The electrode configuration, thus, was similar to that of FIG. 3 except the channel and sparger were rectangular rather than triangular.

The above-described electrode was used as an anode in an electrochemical fluorination cell. It was presoaked in ethylene dichloride (EDC) and immersed about 12 inches in KF·2HF electrolyte maintained at about 93° C. The cathode was an iron grid. Ethylene dichloride was fed into the anode by means of the sparger. The ethylene dichloride bubbles leaving the sparger were rapidly absorbed by the bottom of the porous carbon anode. As the feed material passed upward through the anode, it was fluorinated and it finally left the anode through that portion of the anode above the surface of the electrolyte. Hydrogen was evolved at the cathode and the total cell effluent was conducted to a recovery system. HF was replenished in the electrolyte as it was consumed.

After being on stream for about 24 hours, a sample of the cell effluent, after the hydrogen was removed, was taken during a 1.5-hour period and subjected to gas-liquid chromatography for analysis. The cell conditions during this sampling period were as follows:

| | |
|---|---|
| EDC Feed Rate | 4.86 moles/hr. |
| Current | 250 amp |
| Voltage | 8–10 volts |
| Faradays/mole | 1.91 |
| EDC Conversion | 33.65% |
| EDC Efficiency (to Freon 114 and its precursors) | 85.12% |
| HF Efficiency | 85.18% |

The products obtained from the cell were found to be as follows:

| Freon Product | Mole/Fraction | |
|---|---|---|
| 150 | (feed) | |
| 141 | 0.2580 | |
| 132 | 0.1571 | Freon 114 |
| 132B | 0.0951 | Products |
| 123A | 0.1919 | |
| 114 | 0.1491 | |
| 140 | 0.0212 | |
| 131 | 0.0147 | |
| 131A | 0.0112 | |
| 122 | 0.0131 | |
| 113 | 0.0322 | |
| 142A | 0.0115 | |
| 133 | 0.0101 | |
| 133B | 0.0050 | |
| 124A | 0.0115 | |
| 115 | 0.0081 | |
| 125 | 0.0031 | |
| 12 | 0.0039 | |
| 13 | 0.0032 | |

The data above show that the electrode system of the present invention is capable of efficiently fluorinating an organic feedstock at very high conversions but with very little losses due to scission of carbon to carbon bonds.

EXAMPLE II

The above electrochemical fluorination of ethylene dichloride was repeated using the same anode and sparger configuration but at almost twice the current density and feed rate. The essential data from this run are as follows:

| | |
|---|---|
| EDC Rate | 8.81 moles/hr. |
| Voltage | 8–10 volts |
| Current | 400 amp |
| Faradays/mole | 1.69 |
| EDC Efficiency | 87.82% |
| HF Efficiency | 88.33% |
| EDC Conversion | 32.6% |

The above test illustrates operation of the invention at a very high current density.

EXAMPLE III

In another test in which ethylene dichloride was fluorinated to Freon 114 and related products, the anode was similar to that of Example I except that a groove having a triangular cross section was cut into its bottom. The porous carbon sparger, of Stackpole 139 material, was of a corresponding triangular cross section, about 1-½ inches on an edge, which was neatly fitted and cemented into the cavity of the electrode using a conventional carbon cement (National Carbon C–3 cement) which was both conducting and porous. As in Example I, this triangular sparger contained a drilled ¼-inch lateral hole which was in communication with the feed supply. Thus, this electrode resembled that of FIG. 3.

Under conditions largely similar to that of preceding examples, the ethylene dichloride was satisfactorily converted over a 24-hour period at 8–10 volts, 215 amp, and about a 4.8 mole/hour feed rate.

This run illustrates that the sparger of the anode assembly can also be operated when in close electrical contact with the anode.

EXAMPLE IV

A porous carbon electrode having a sandwich construction using two types of porous carbon was tested. A slab of the previously described Stackpole 139 porous carbon measuring 6 × 12 × ¾ inches was bonded between two pieces of porous carbon (National Carbon NC–45 having an average pore size of about 55 microns, a permeability of about 20 darcys, and an average porosity of about 50 per cent) which measured 6 × 14 × ¾ inches using National Carbon C–3 cement. This laminate was dried overnight at 215°–220° F. The bottom 2 inches of the 14-inch long NC–45 sections extended below the 12-inch long inner core and formed a channel for the feed sparger. The sparger was a piece of Stackpole 139 carbon measuring 1 × 6 × ¾ inches and containing a 5/16-inch hole through most of its length for the introduction of the feed. The lower edge of this feed sparger was even with the lower edge of the NC–45 skirt, being held in position by Teflon and plates fastened to both the sparger and the electrode. A void measuring 6 × 1 × ¾ inches thus remained between the sparger and the electrode. The sparger was not electrically connected. Two copper current conductors were conveniently mounted within the core, extending about 5 inches into the Stackpole 139 section. The electrode, thus, resembled that of FIG. 6.

The above-described electrode was used as an anode in the electrochemical fluorination of ethylene dichloride, being immersed about 12 inches into the KF·2HF electrolyte in the same cell described in Example I. The cell operated satisfactorily for about 5 days at 8–9 volts and at a current density of 200 ma/cm² producing substantial amounts of Freon 114 and related products.

EXAMPLE V

A 14 × 1-⅜ inch OD cylinder of porous carbon (National Carbon PC 45) having a flat bottom and fitted with a copper current collector was employed as an anode in an electrochemical conversion operation similar to that of Example I. The sparger was a short cylinder of ¾-inch OD porous carbon (Stackpole 139) and was disposed directly under the flat bottom of the porous carbon anode in a manner similar to that shown in FIG. 7 except that the anode was cylindrical rather than rectangular. The anode immersion was 10 inches and the sparger was spaced about one-eighth inch from the anode. Ethylene dichloride was introduced into the interior of the sparger under sufficient pressure to cause it to bubble out into the electrolyte where it immediately rose to contact and to be absorbed by the porous anode wherein it was fluorinated, at a current density of 400 ma/cm², to products similar to those obtained in Example I.

EXAMPLE VI

A porous carbon anode was constructed from a cylinder of porous carbon (NC-45) measuring 14 inches long and 1-⅜ inches in diameter. A copper pin was inserted into the top of the cylinder as a current collector and a ¾-inch diameter hole was drilled axially into the bottom of the cylinder to provide a cavity about three-fourths inch deep.

The above-described electrode was used as an anode in an electrochemical fluorination cell which contained KF·2HF as the electrolyte maintained at 94°–110° C., an iron cathode, and an ethylene dichloride feed tube which terminated in a porous polytetrafluoroethylene sparger in the form of a disc about three-eighths inch in diameter and three-sixteenths inch in thickness. The sparger was located directly beneath the cavity in a manner similar to that of FIG. 5. The anode was submerged 4 inches in the electrolyte and, during operation, the fluorinated products and unconverted feed material exited the anode through the portion of the porous carbon which extended above the surface of the electrolyte. Hydrogen was evolved at the cathode.

Ethylene dichloride was successfully fluorinated with this electrode and cell arrangement in a run of about 20 hours duration, at a current level of 42–49 amps, at about 7.8 volts, and at a feed rate of about 100 ml ethylene dichloride per hour.

While this invention has been described in detail for the purpose of illustration, it is not to be construed as limited thereby but is intended to cover all changes and modifications within the spirit and scope thereof.

We claim:

1. An electrode assembly, suitable for carrying out electrochemical reactions in an electrolysis cell containing an electrolyte, comprising, in combination:

An electrode element comprising a porous material;
a downwardly open cavity, open to the bulk of said electrolyte, formed in the lower portion of said electrode element, at least a portion of the inner wall of said cavity comprising a first surface for introducing a reactant feedstock into the pores of said electrode element;
a sparger disposed within said cavity adjacent said first surface with said cavity remaining open to the bulk of said electrolyte; and
conduit means in communication with said sparger for introducing said feedstock through said sparger and thereafter into contact with said first surface.

2. An electrode assembly according to claim 1 wherein:
said cavity comprises a laterally extending channel in the lower portion of said element, generally parallel to the bottom of said element, and in communication with the bulk of said electrolyte;
the wall of said channel comprises said first surface; and
said sparger is disposed within said channel.

3. An electrode assembly according to claim 2 wherein:
said electrode element comprises porous carbon and is generally rectangular in shape;
said channel is annular in shape; and
said sparger comprises porous carbon and is generally cylindrical in shape.

4. An electrode assembly in accordance with claim 2 wherein said sparger is electrically connected to said electrode element.

5. An electrode assembly according to claim 1 wherein:
at least the outer portion of said electrode element comprises porous carbon having an average pore diameter within the range of 1 to 150 microns; and
said sparger comprises porous carbon having an average pore diameter of between 0.01 and 30 microns.

6. An electrode assembly according to claim 1 wherein:
at least the outer portion of said electrode element comprises porous carbon having an average pore diameter between 50 and 120 microns; and
said sparger comprises porous carbon having an average pore diameter of between 0.1 and 10 microns.

7. An electrode assembly according to claim 1 wherein:
said electrode element comprises porous carbon and is generally rectangular in shape; and
said sparger comprises porous carbon and is generally complementary in shape to said cavity.

8. An electrode assembly in accordance with claim 7 wherein said sparger is electrically connected to said electrode element.

9. An electrode assembly according to claim 7 wherein said sparger is suspended in said cavity by means of an insulating member connected to said porous electrode element and said sparger.

10. An electrode assembly according to claim 1 wherein:
said electrode element is generally cylindrical in shape and comprises a central core of essentially nonporous carbon, and an outer layer of porous carbon surrounding said core, with said outer layer extending below the lower end of said core to form said cavity in the bottom of said electrode element;
a current collector comprising a metal tube extends through said core into communication with said cavity;
said sparger is generally cylindrical in shape, is closed at one end thereof, and comprises a porous nonconducting plastic material; and
said sparger is disposed in said cavity with the open end thereof fixed to said core and forming a chamber which encloses the lower end of said current collector.

11. An electrode assembly according to claim 10 wherein:
said current collector extends through said core beyond the bottom thereof and into said cavity; and
the open end of said sparger is fixed to said extended end of said current collector so as to enclose the open end thereof.

12. An electrode assembly according to claim 1 wherein:
said electrode element is generally rectangular in shape and comprises a core of essentially nonporous carbon, and an outer layer of porous carbon fixed to each side of said core;
a centrally disposed extension is provided on the bottom of said core;
a passageway extends through said extension of said core;
a current collector comprising a hollow metal conduit extends through said core and into communication with said passageway; and
said sparger comprises a pair of sparger elements, formed of a porous nonconducting plastic material, fixed to opposite sides of said extension of said core in communication with said passageway.

13. An electrode assembly according to claim 1 wherein:
said electrode element is generally rectangular in shape and comprises a core of essentially nonporous carbon, and an outer layer of porous carbon fixed to each side of said core;
a centrally disposed extension is provided on the bottom of said core;
a passageway extends through said extension of said core;
a current collector comprising a hollow metal conduit extends through said core and into communication with said passageway; and
said sparger comprises a pair of sparger elements, formed of porous carbon, fixed to opposite sides of said extension of said core in communication with said passageway.

14. An electrode assembly according to claim 1 wherein:
said electrode element is generally cylindrical in shape and comprises a central core of essentially nonporous carbon, and an outer layer of porous carbon surrounding said core, with said outer layer extending below the lower end of said core to form said cavity in the bottom of said electrode element;
a current collector comprising a metal tube extends through said core into communication with said cavity;
said sparger is generally cylindrical in shape, is closed at one end thereof, and comprises porous carbon; and
said sparger is disposed in said cavity with the open end thereof fixed to said core and forming a chamber which encloses the lower end of said current collector.

15. An electrode assembly according to claim 14 wherein:
said current collector extends through said core beyond the bottom thereof and into said cavity; and
the open end of said sparger is fixed to said extended end of said current collector so as to enclose the open end thereof.

16. An electrode assembly, suitable for carrying out electrochemical reactions in an electrolysis cell containing an electrolyte, comprising, in combination:
an electrode element comprising a porous material and having a downwardly facing first surface for introducing a reactant feedstock into the pores of said element;
a sparger disposed below said first surface and electrically connected to said electrode element; and
conduit means in communication with said sparger for introducing said reactant feedstock through said sparger and thereafter into contact with said first surface.

17. An electrode assembly according to claim 16 wherein said electrode element comprises porous carbon.

18. An electrode assembly according to claim 16 wherein:
said electrode element has a flat bottom which comprises said first surface; and
said sparger is disposed below said flat bottom.

19. An electrode assembly according to claim 18 wherein said electrode element and said sparger each comprises porous carbon.

* * * * *